(12) United States Patent
Nakayama

(10) Patent No.: US 11,964,724 B2
(45) Date of Patent: Apr. 23, 2024

(54) FIXING STRUCTURE OF SCREEN

(71) Applicant: SUZUKI MOTOR CORPORATION, Hamamatsu (JP)

(72) Inventor: Yoshihisa Nakayama, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 108 days.

(21) Appl. No.: 17/462,321

(22) Filed: Aug. 31, 2021

(65) Prior Publication Data

US 2022/0073164 A1 Mar. 10, 2022

(30) Foreign Application Priority Data

Sep. 7, 2020 (JP) ................................. 2020-149717

(51) Int. Cl.
*B62J 17/04* (2006.01)
*B62J 11/00* (2020.01)

(52) U.S. Cl.
CPC ............... *B62J 17/04* (2013.01); *B62J 11/00* (2013.01)

(58) Field of Classification Search
CPC .................................. B62J 17/04; B62J 11/00
See application file for complete search history.

(56) References Cited

U.S. PATENT DOCUMENTS

| 5,979,966 A | 11/1999 | Suzuki |
| 2016/0280324 A1* | 9/2016 | Schafer .................. F01N 13/10 |
| 2019/0061858 A1* | 2/2019 | Goodrick ................ B62J 17/04 |

FOREIGN PATENT DOCUMENTS

| JP | S63-032980 U | 3/1988 |
| JP | S64-022592 U | 2/1989 |
| JP | H10-273082 A | 10/1998 |
| JP | 2004-168306 A | 6/2004 |
| JP | 2004168306 A | * 6/2004 |
| JP | 2009107570 A | 5/2009 |

OTHER PUBLICATIONS

JP-2004168306-A; Jun. 2004; Computer translation (Year: 2004).*
Extended European Search Report issued in EP 21194055.6 dated Feb. 2, 2022.

* cited by examiner

*Primary Examiner* — Amy R Weisberg
*Assistant Examiner* — Melissa Ann Bonifazi
(74) *Attorney, Agent, or Firm* — TROUTMAN PEPPER HAMILTON SANDERS LLP

(57) ABSTRACT

A fixing structure of a screen includes a front cowl configured to cover a vehicle front portion, a meter panel disposed at a rear side of the front cowl, and a screen installed between the front cowl and the meter panel. An attachment piece is formed along a front edge of the screen. A first support portion configured to support the attachment piece from a back side is formed on the meter panel. A pressing portion configured to press the attachment piece from a front side is formed on the front cowl.

6 Claims, 11 Drawing Sheets

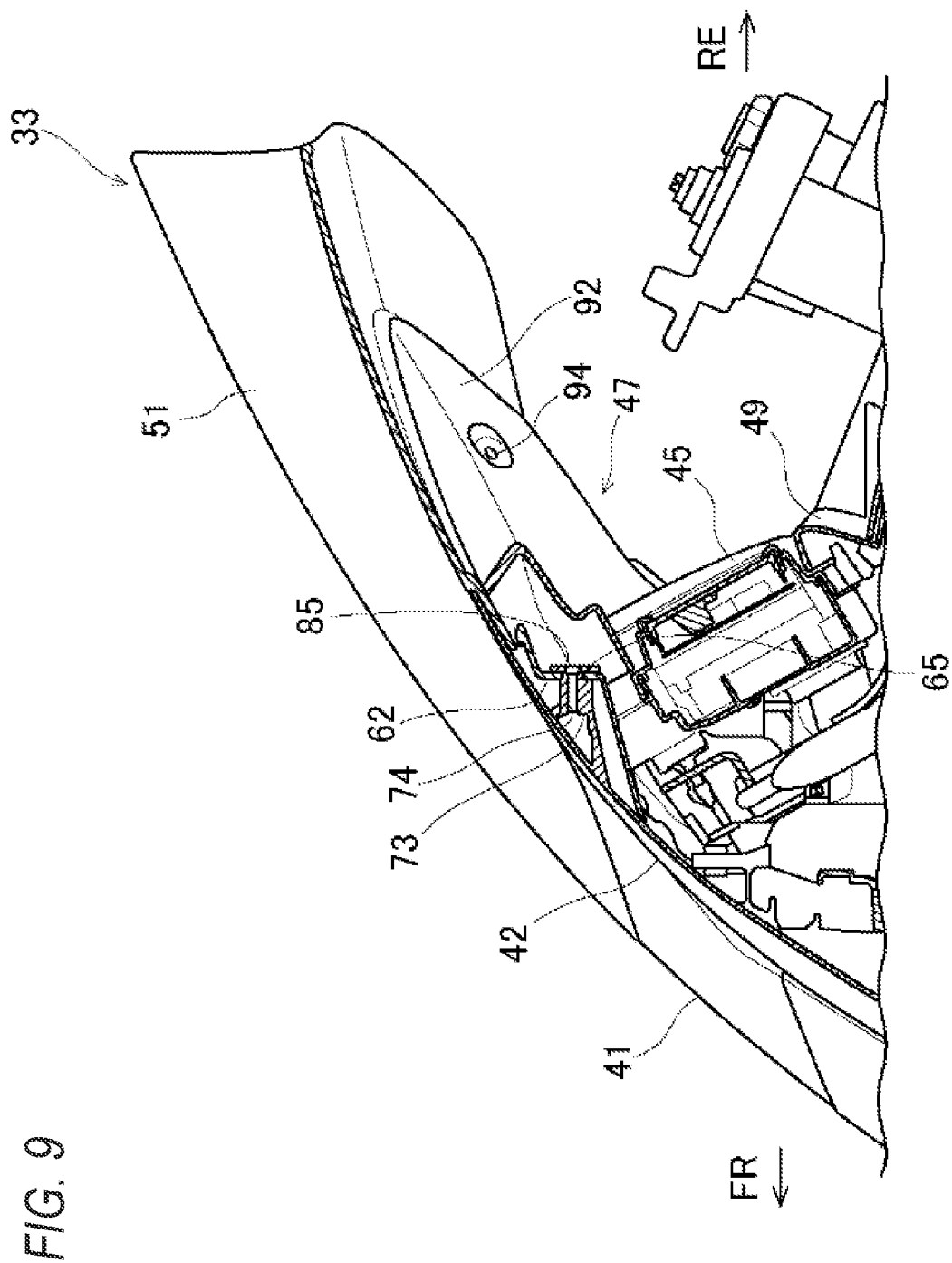

ately rigid to replace the screen, but if the number of fixing
FIXING STRUCTURE OF SCREEN

CROSS-REFERENCE TO RELATED APPLICATIONS

The disclosure of Japanese Patent Application No. 2020-149717 filed on Sep. 7, 2020, the contents of which is incorporated herein by reference in its entirety.

BACKGROUND

The present invention relates to a fixing structure of a screen.

In a saddle-ridden vehicle such as a motorcycle, a screen is provided on an upper portion of a front cowl in order to protect an occupant from traveling wind (for example, see JP-A-H10-273082). In a fixing structure of a screen described in Patent Literature 1, a front edge of the screen enters a back side of a front cowl, and the front edge of the screen is fixed by a fixing member such as a screw from a front side of the front cowl. In this type of fixing structure of the screen, rigidity of the screen is increased by, for example, increasing thickness of the screen or the number of fixed portions of the screen so that the screen does not vibrate due to the traveling wind.

SUMMARY

According to one advantageous aspect of the preset invention, there is provided a fixing structure of a screen, including a front cowl configured to cover a vehicle front portion; a meter panel disposed at a rear side of the front cowl; and a screen installed between the front cowl and the meter panel, wherein an attachment piece is formed along a front edge of the screen, a first support portion configured to support the attachment piece from a back side is formed on the meter panel, and a pressing portion configured to press the attachment piece from a front side is formed on the front cowl.

BRIEF DESCRIPTION OF DRAWINGS

FIG. 9 is a cross-sectional view taken along a line B-B of FIG. 2.

DETAILED DESCRIPTION

It is important that the fixing structure of the screen makes it easy to replace the screen, but if the number of fixing members is reduced, rigidity of the screen is reduced. On the other hand, if the number of fixing members is increased in consideration of the rigidity of the screen, replacement work of the screen becomes complicated. As described above, there is a trade-off relationship between workability of the replacement work of the screen and the rigidity of the screen.

The present invention has been made in view of the above circumstances, and an object thereof is to provide a fixing structure of a screen that can easily replace the screen while securing rigidity of the screen.

In a fixing structure of a screen according to one aspect of the present invention, a screen is installed between a front cowl that covers a vehicle front portion and a meter panel behind the front cowl. An attachment piece is formed along a front edge of the screen. The attachment piece is supported from a back side by a support portion of the meter panel, and the attachment piece is pressed from a front side by a pressing portion of the front cowl, so that the attachment piece of the screen is sandwiched between the meter panel and the front cowl. A combination of the sandwiching of the attachment piece of the screen and fixing using fixing members minimizes the number of the fixing members, secures rigidity of the screen, and improves workability of replacement work of the screen.

Figure 1:
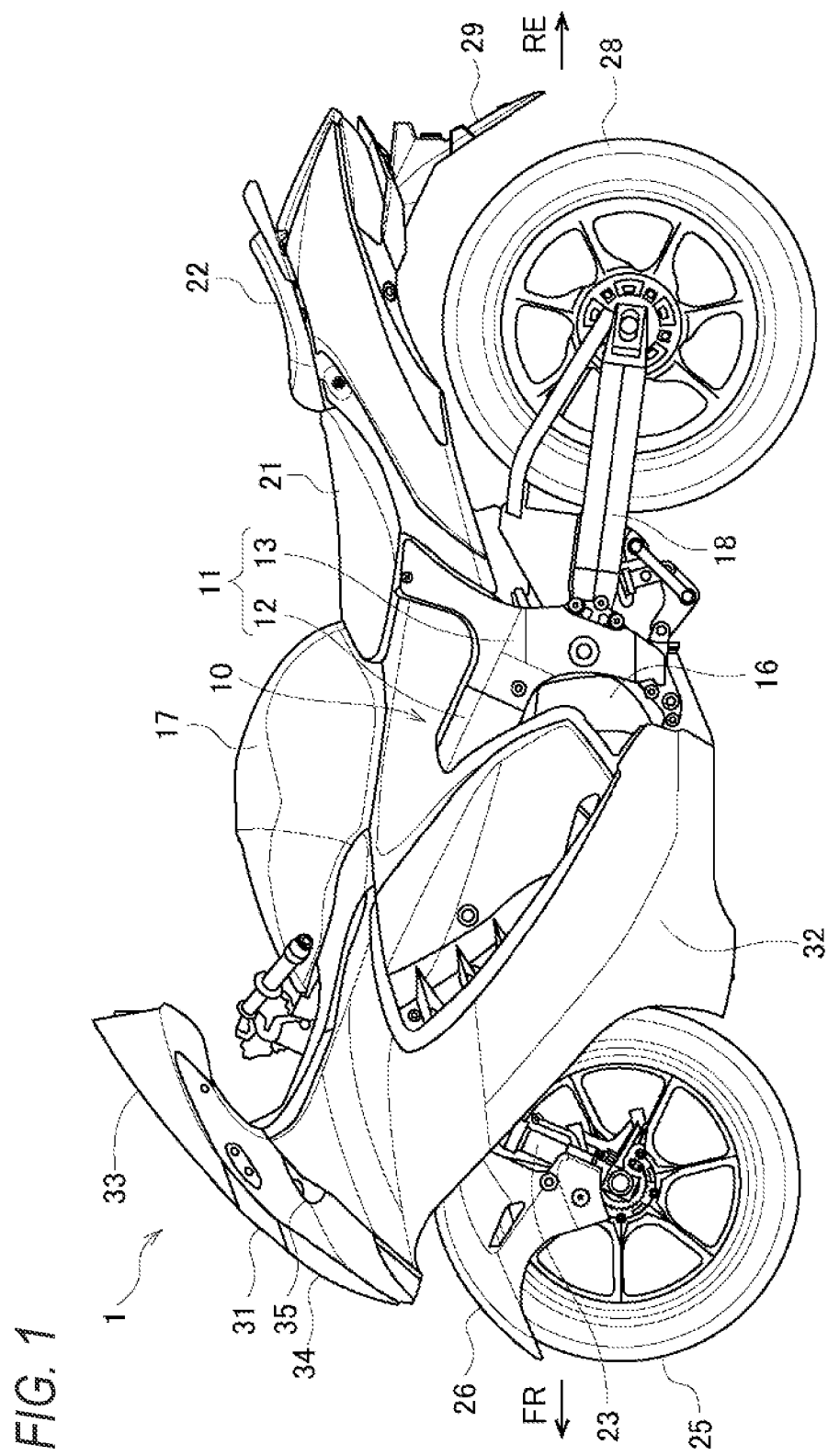
FIG. 1 is a left side view of a saddle-ridden vehicle according to the present embodiment.

Hereinafter, the present embodiment will be described in detail with reference to the accompanying drawings. FIG. 1 is a left side view of the straddle-type vehicle according to the present embodiment. In the following drawings, an arrow FR indicates a vehicle front side, an arrow RE indicates a vehicle rear side, an arrow L indicates a vehicle left side, and an arrow R indicates a vehicle right side.

As illustrated in FIG. 1, a straddle-type vehicle 1 is configured by mounting various components such as an engine 16 and an electrical system on a twin spar-type vehicle body frame 10 formed by aluminum casting. The vehicle body frame 10 includes a pair of main frames 11 branching from a head pipe (not illustrated) to left and right and extending rearward, and a pair of down frames (not illustrated) branching from the head pipe to the left and right and extending downward. A rear portion of the engine 16 is supported by the pair of main frames 11, and a front portion of the engine 16 is supported by the pair of down frames. By supporting the engine 16 with the vehicle body frame 10, the rigidity of the entire vehicle is ensured.

Front portions of the pair of main frames 11 serve as tank rails 12 located above the engine 16, and a fuel tank 17 is supported by the tank rails 12. Rear portions of the pair of main frames 11 serve as body frames 13 located behind the engine 16, and swing arms 18 are swingably supported in substantially intermediate positions in an upper-lower direction of the body frames 13. Seat rails (not illustrated) and a back stay (not illustrated) extend rearward from upper portions of the body frames 13. A rider seat 21 and a pillion seat 22 are supported on the seat rails behind the fuel tank 17.

A pair of front forks 23 are supported on the head pipe via a steering shaft (not illustrated) so as to be steered. A front wheel 25 is rotatably supported by lower portions of the front forks 23, and an upper portion of the front wheel 25 is covered with a front fender 26. The swing arms 18 extend rearward from the body frames 13. A rear wheel 28 is rotatably supported at rear ends of the swing arms 18, and an upper side of the rear wheel 28 is covered with a rear fender 29. The engine 16 is coupled to the rear wheel 28 via a chain drive-type transmission mechanism, and power from the engine 16 is transmitted to the rear wheel 28 via the transmission mechanism.

Some covers are attached to the vehicle body frame 10 of the straddle-type vehicle 1 as a vehicle body exterior. For example, a front surface side of the vehicle front portion is covered with a front cowl 31, and side surface sides of the vehicle front portion are covered with a pair of side cowls 32. A screen 33 is provided on an upper portion of the front cowl 31, and a headlamp 34 and a pair of turn signal lamps 35 are exposed from a front surface of the front cowl 31. The front cowl 31, the screen 33, the headlamp 34, the pair of turn signal lamps 35, and the pair of side cowls 32 form a streamlined shape that reduces air resistance received from traveling wind.

When the screen 33 is damaged, it is necessary to remove the screen 33 from the front cowl 31 and replace the screen 33 with a new screen 33. It is desirable to reduce the number of fixing members such as screws in order to facilitate replacement of the screen 33, but if the number of fixing members is too small, rigidity of the screen 33 is reduced and the screen 33 is likely to vibrate. Therefore, in the present embodiment, the screen 33 is sandwiched between the front cowl 31 and the meter panel 47 (see FIG. 4). The sandwiching of the screen 33 and the fixing using the fixing members are combined to secure the rigidity of the screen 33 while minimizing the number of fixing members.

Figure 2:
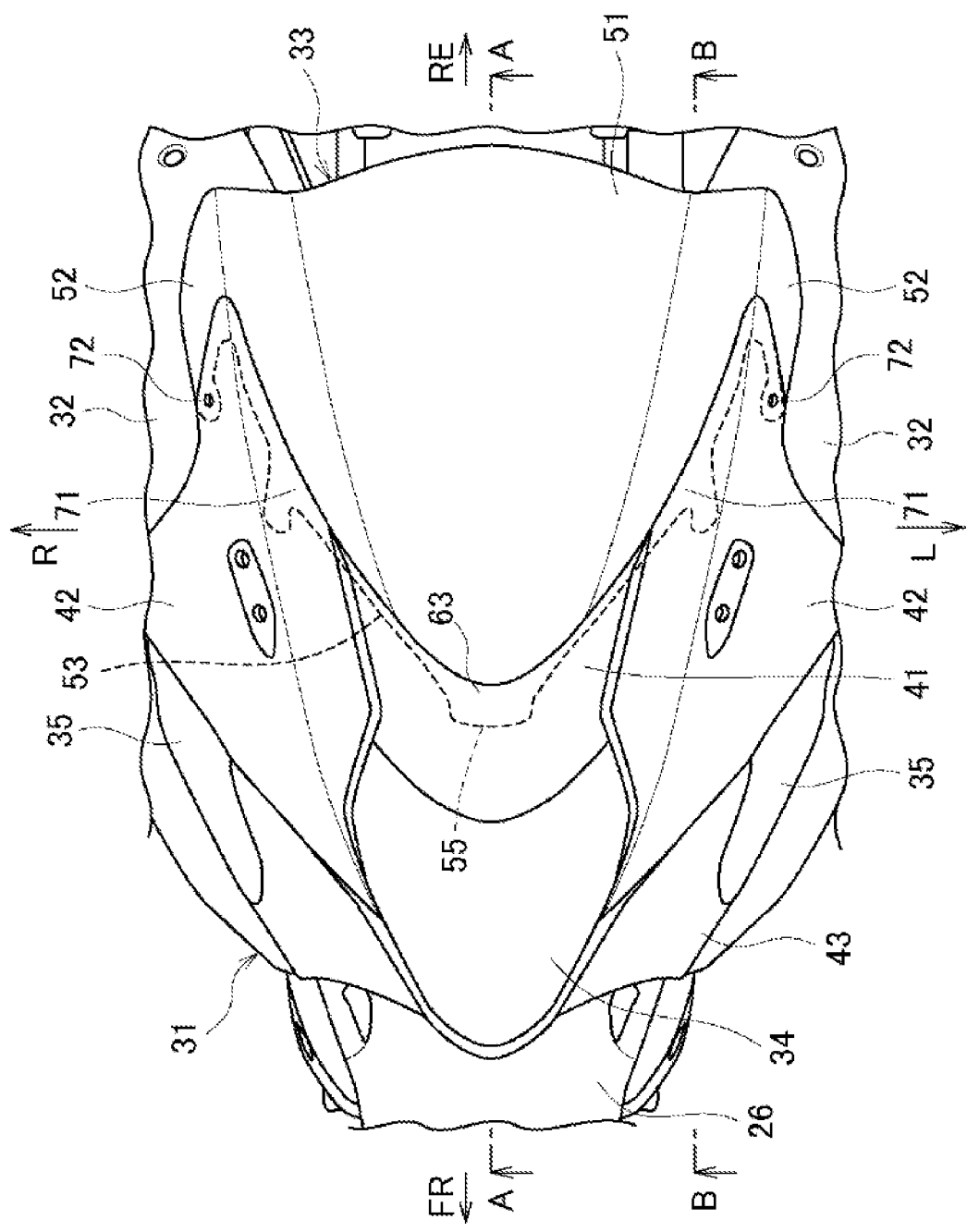
FIG. 2 is a top view of a vehicle front portion according to the present embodiment.
Figure 3:
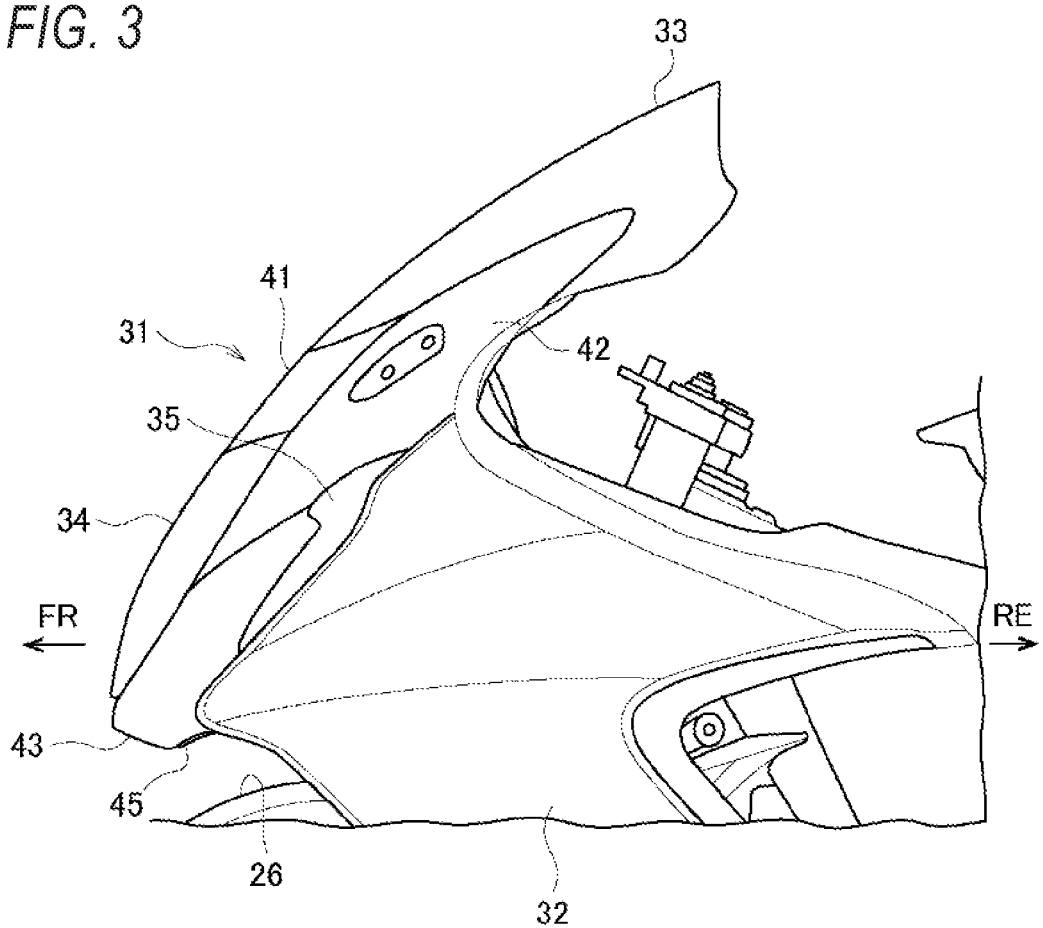
FIG. 3 is a side view of the vehicle front portion according to the present embodiment.
Figure 4:
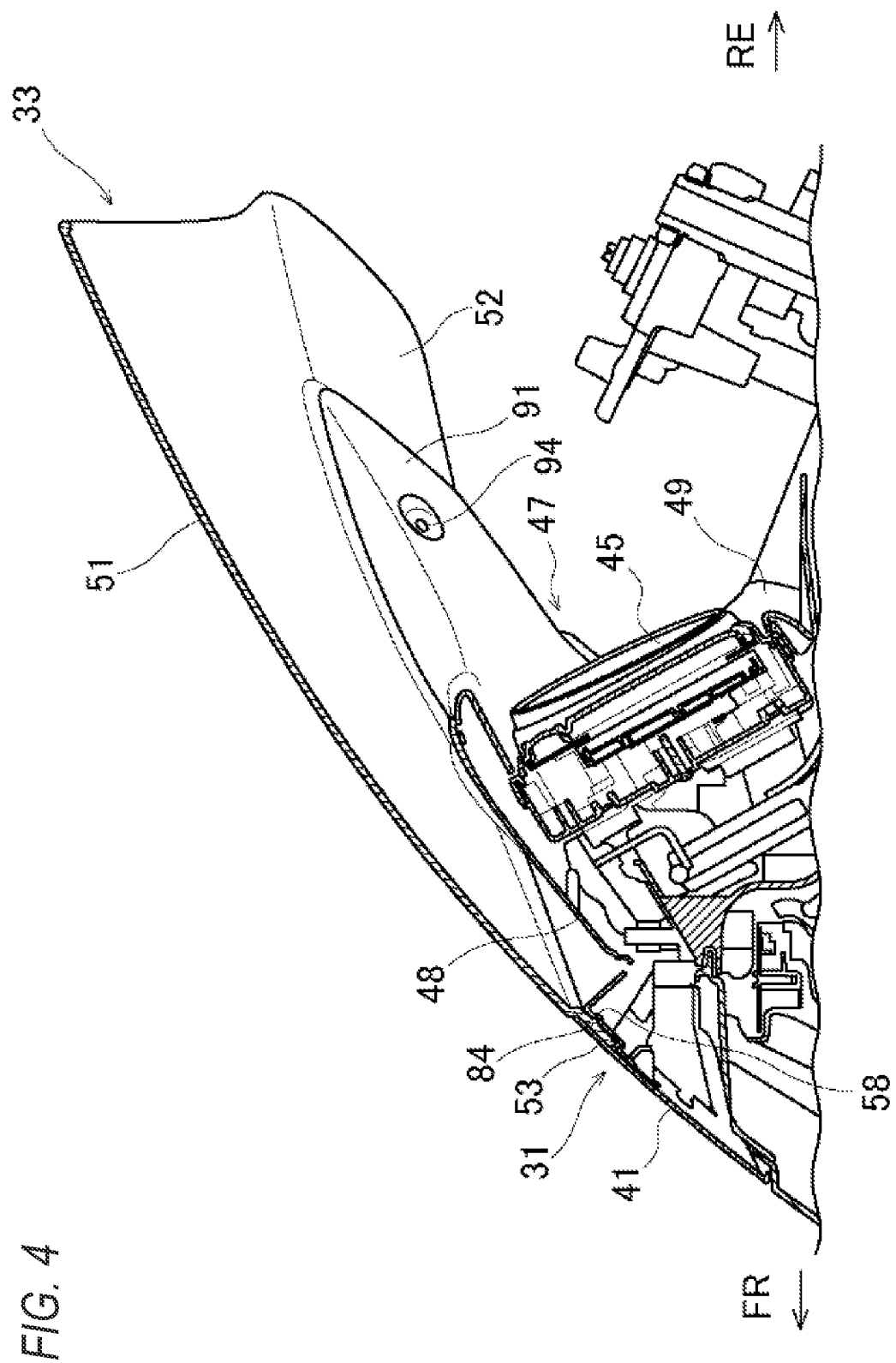
FIG. 4 is a cross-sectional view taken along a line A-A of FIG. 2.
Figure 5:
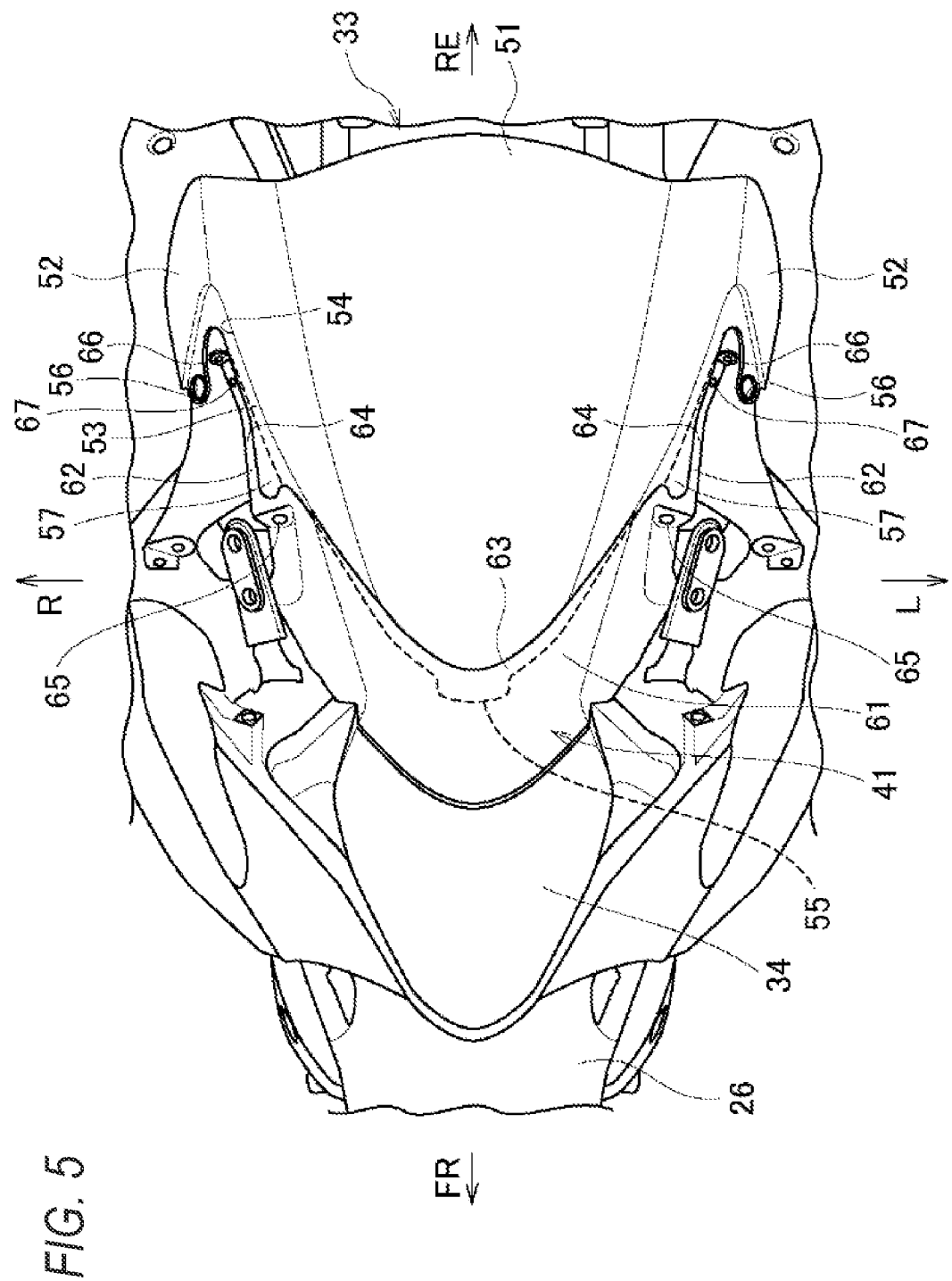
FIG. 5 is a top view in which a front side cowl is removed from FIG. 2.
Figure 6:
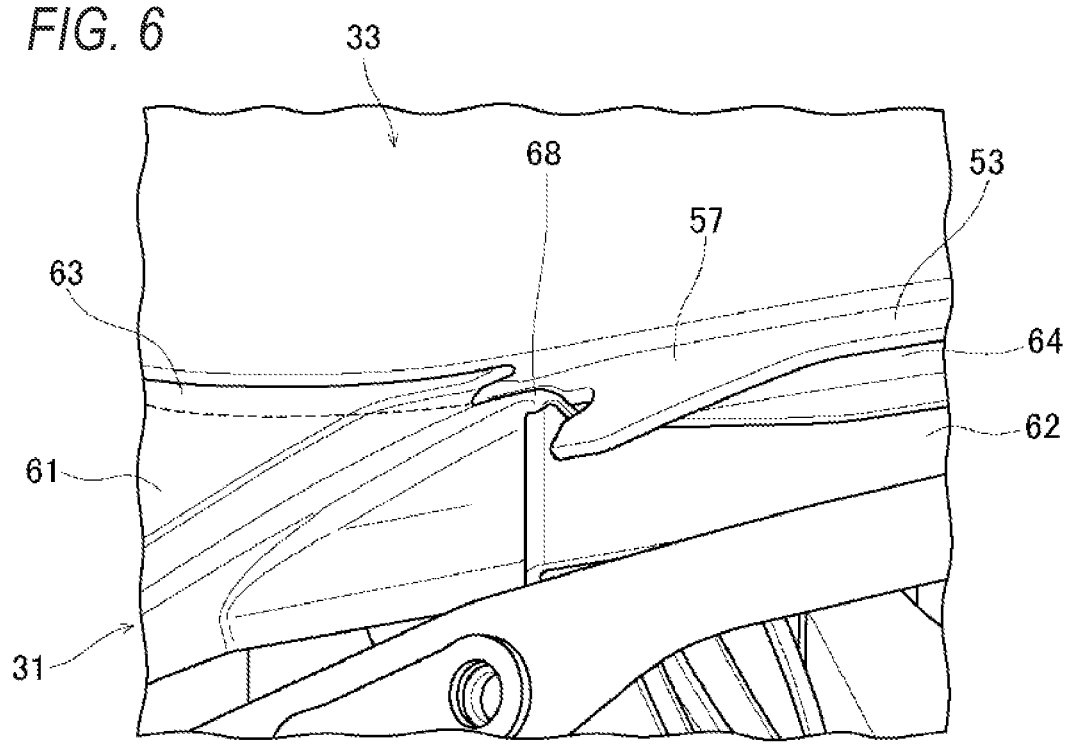
FIG. 6 is a perspective view of a periphery of a hook according to the present embodiment.
Figure 7:
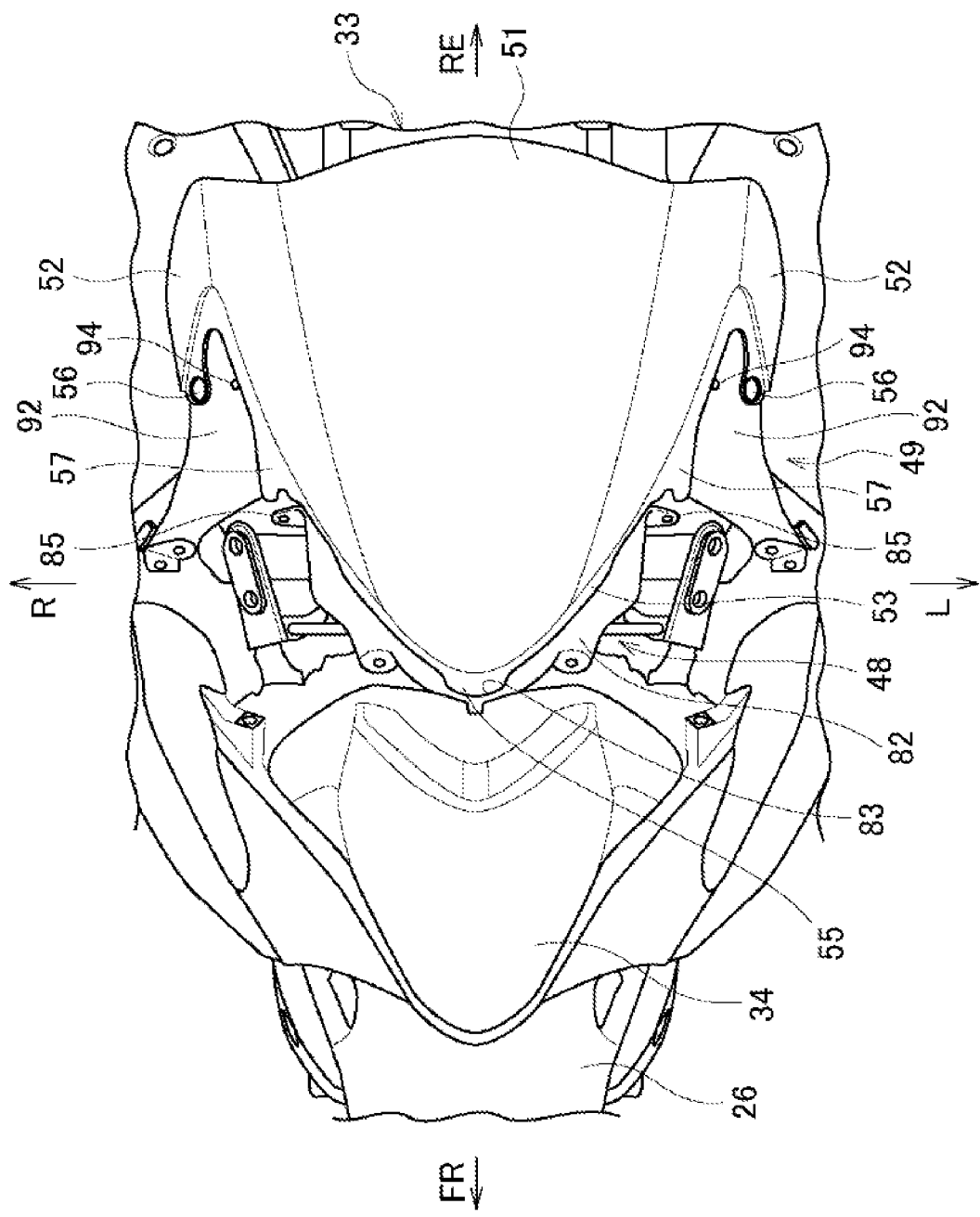
FIG. 7 is a top view in which a front center cowl is removed from FIG. 5.
Figure 8:
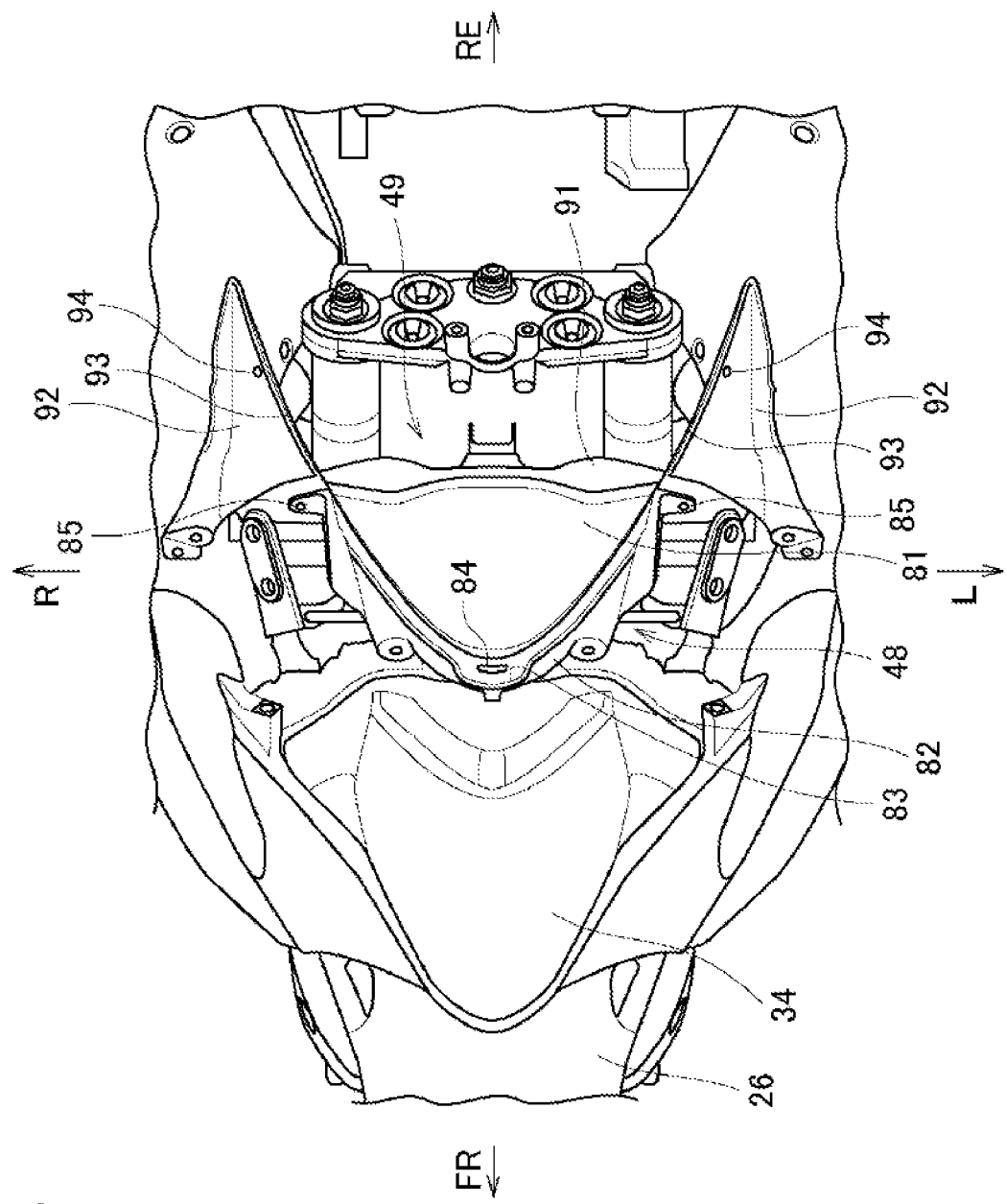
FIG. 8 is a top view in which a screen is removed from FIG. 7.

Hereinafter, the fixing structure of the screen will be described with reference to FIGS. 2 to 9. FIG. 2 is a top view of a vehicle front portion according to the present embodiment. FIG. 3 is a side view of the vehicle front portion according to the present embodiment. FIG. 4 is a cross-sectional view taken along a line A-A of FIG. 2. FIG. 5 is a top view in which a front side cowl is removed from FIG. 2. FIG. 6 is a perspective view of a periphery of a hook according to the present embodiment. FIG. 7 is a top view in which a front center cowl is removed from FIG. 5. FIG. 8 is a top view in which the screen is removed from FIG. 7. FIG. 9 is a cross-sectional view taken along a line B-B of FIG. 2. In FIG. 8, for convenience of explanation, a meter and the like are omitted.

As shown in FIGS. 2 and 3, the windbreak screen 33 is provided on an upper portion of the front cowl 31, and the pair of side cowls 32 are provided on a left edge and a right edge of the front cowl 31. The front cowl 31 is formed so as to cover a base end side of the screen 33 and a periphery of the central headlamp 34. The turn signal lamps 35 are provided between the front cowl 31 and the pair of side cowls 32. A streamlined shape is formed which draws a curve of an upward gradient from a front end of the headlamp 34 toward a rear end of the screen 33 and which draws a curve that widens a vehicle width from the front end of the headlamp 34 toward rear ends of the side cowls 32.

The front cowl 31 is formed by a plurality of cowl members. The front surface of the front cowl 31 is formed by a front center cowl 41 that covers a front side of the screen 33, a pair of front side cowls 42 that cover both left and right sides of the screen 33, and a front under cowl 43 that covers a lower side of the headlamp 34. A lower surface of the front cowl 31 is formed by a part of the front under cowl 43 and a front bottom cowl (not shown) that covers the lower side of the headlamp 34. The screen 33 is pressed from a front side by the front center cowl 41 and the front side cowls 42.

As shown in FIG. 4, the meter panel 47 on which various meters 45 are installed is provided behind the front cowl 31. The meter panel 47 is formed by a front meter panel 48 that covers the meters 45 from a front side and a rear meter panel 49 that covers the meters 45 from a rear side. The screen 33 is supported from a back side by the front meter panel 48. The screen 33 is installed between the front cowl 31 and the meter panel 47, and a fixing structure of the screen 33 is formed by utilizing the sandwiching of the screen 33 by the front cowl 31 and the meter panel 47.

As shown in FIG. 5, the screen 33 includes a dome-shaped front surface portion 51 and a pair of side surface portions 52 connected to a rear side of the front surface portion 51. A tip end of each side surface portion 52 extends obliquely forward from the rear side of the front surface portion 51. An attachment piece 53 is formed along front edges of the front surface portion 51 and the side surface portions 52. The attachment piece 53 is one step lower than the front surface portion 51 and the side surface portions 52, a front surface of the attachment piece 53 is recessed more than those of the front surface portion 51 and the side surface portions 52, and a back surface of the attachment piece 53 protrudes more than those of the front surface portion 51 and the side surface portions 52. Therefore, a step 54 is formed at a boundary between the attachment piece 53 and the front surface portion 51 as well as the side surface portions 52.

The step 54 of the screen 33 abuts against outer edges of the front center cowl 41 and the pair of front side cowls 42 (see FIG. 2), and the screen 33 is positioned with respect to the front center cowl 41 and the pair of front side cowls 42. A positioning protrusion 55 for positioning the screen 33 on the front meter panel 48 (see FIG. 7) is formed at a front end of the attachment piece 53, and a pair of first fixing holes 56 for fixing the screen 33 to the front side cowls 42 are formed in both ends of the attachment piece 53. Further, a pair of hooks 57 for hooking the screen 33 to the front center cowl 41 are formed at an intermediate position of the attachment piece 53.

The front center cowl 41 includes an outer cowl 61 exposed between the pair of front side cowls 42 (see FIG. 2), and a pair of inner cowls 62 that enter back sides of the front side cowls 42 from both left and right sides of the outer cowl 61. The outer cowl 61 covers a front side of the attachment piece 53, and each inner cowl 62 enters a back side of the attachment piece 53. A peripheral edge of the outer cowl 61 on the front side of the attachment piece 53 serves as a pressing portion 63 that presses the attachment piece 53 from a front side, and a peripheral edge of each inner cowl 62 on the back side of the attachment piece 53 serves as a support portion 64 (a second support portion) that supports the attachment piece 53 from a back side.

In each inner cowl 62, a vicinity of the hook 57 of the attachment piece 53 is bent so as to be one step lower toward a front side of the vehicle, and a second fixing hole 65 for fixing the front side cowl 42 to the front center cowl 41 is formed in an upright surface of the bent portion. A rear end of each inner cowl 62 stands upright between the front surface portion 51 and the side surface portion 52 of the screen 33, and a third fixing hole 66 for fixing the front side cowl 42 to the front center cowl 41 is formed in the upright surface. A fourth fixing hole 67 for fixing the rear meter panel 49 (see FIG. 8) to the front center cowl 41 (the inner cowl 62) is formed in the vicinity of the third fixing hole 66 of each inner cowl 62.

As shown in FIG. 6, the pressing portion 63 of the outer cowl 61 is on the front side of the attachment piece 53 of the screen 33, and the attachment piece 53 is pressed from the front side by the pressing portion 63. The support portion 64 of the inner cowl 62 is on the back side of the attachment piece 53 of the screen 33, and the attachment piece 53 is supported from the back side by the support portion 64. A boundary portion between the pressing portion 63 and the support portion 64 is one step lower than the pressing portion 63 and one step higher than the support portion 64, and a hook portion 68 on which the hook 57 of the attachment piece 53 is hooked is formed at the boundary portion. Since the hooks 57 are hooked to hook portions 68, the screen 33 can be easily attached to the front cowl 31.

Figure 11:
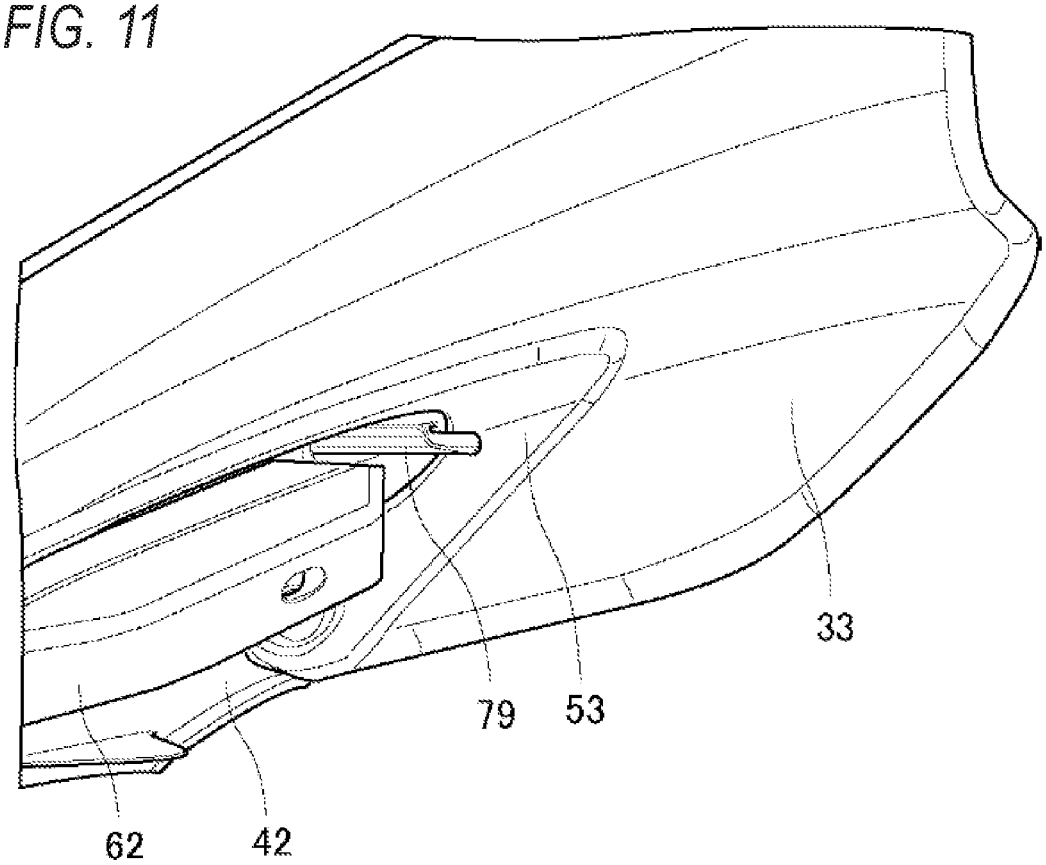
FIG. 11 is a perspective view of a part of the screen of the present embodiment when viewed from a back surface side.

As shown in FIG. 2, the front side cowls 42 cover the front side of the attachment piece 53 supported by the inner cowls 62. A peripheral edge of each front side cowl 42 on the front side of the attachment piece 53 serves as a pressing portion 71 that presses the attachment piece 53 from a front side. A fifth fixing hole 72 for fixing the front side cowl 42 to the screen 33 is formed on a rear end side of each front side cowl 42. A pair of fifth fixing holes 72 of the front side cowls 42 are formed at positions corresponding to the pair of first fixing holes 56 (see FIG. 5) of the attachment piece 53, and the screen 33 is screwed to the front side cowls 42 at two left and right portions where the fixing holes 72 and 56 overlap each other. As shown in FIG. 11, a hook 79 that protrudes in the vicinity of the pressing portion 71 (see FIG. 2) is formed on the back side of each front side cowl 42. The hook 79 is formed to be able to be hooked from a rear side, and when the attachment piece 53 of the screen 33 enters the hook 79, the screen 33 is firmly held by the front side cowl 42. Further, the hook 79 also functions as a rib that increases rigidity of the front side cowl 42. Since rigidity of the pressing portion 71 of the front side cowl 42 is increased by the hook 79, the attachment piece 53 is firmly held.

As shown in FIGS. 7 and 8, the front meter panel 48 includes a front panel main body 81 that covers a front side of the meters 45 (see FIG. 4), and a support portion 82 (a first support portion) that bulges from a front surface of the front panel main body 81 and supports the attachment piece 53 from a back side. The support portion 82 is formed in a U shape in a top view, and faces the pressing portion 63 of the front center cowl 41 (see FIG. 5). A front surface of the support portion 82 is slightly recessed along an outer shape of the attachment piece 53, and a positioning recess 83 is formed by the recess of the support portion 82. The screen 33 is positioned with respect to the front meter panel 48 by the positioning protrusion 55 of the attachment piece 53 entering the positioning recess 83 of the support portion 82.

A shallow groove 84 long in a left-right direction is formed in a front surface of the positioning recess 83, and a protrusion 58 (see FIG. 4) long in the left-right direction is formed on a back surface of the positioning protrusion 55 of the attachment piece 53. In a state where the positioning protrusion 55 enters the positioning recess 83, the shallow groove 84 of the positioning recess 83 and the protrusion 58 of the positioning protrusion 55 overlap each other. Therefore, it is recognized whether the positioning protrusion 55 has completely entered the positioning recess 83 according to a response when the protrusion 58 is fitted into the shallow groove 84. A pair of sixth fixing holes 85 for fixing the front side cowls 42 to the front meter panel 48 are formed in a pair of brackets at a rear end of the front panel main body 81.

As shown in FIG. 9, a fixing portion 73 extends from a back surface of the front side cowl 42 toward the inner cowl 62 of the front center cowl 41. A seventh fixing hole 74 for fixing the front side cowl 42 to the inner cowl 62 and the front meter panel 48 is formed in the fixing portion 73. The seventh fixing hole 74 of the front side cowl 42 is formed at a position corresponding to the second fixing hole 65 of the inner cowl 62 and the sixth fixing hole 85 of the front meter panel 48. The front side cowl 42 is screwed to the inner cowl 62 and the front meter panel 48 from an inner side of the vehicle at a portion where the fixing holes 74, 65, and 85 overlap each other.

Returning to FIGS. 7 and 8, the rear meter panel 49 includes a rear panel main body 91 that covers a rear side of the meters 45 (see FIG. 4), and a pair of guide panels 92 located on an outer side of the rear panel main body 91 in a vehicle width direction. The pair of guide panels 92 are formed in a triangular shape in a top view, and face the front side cowls 42 (see FIG. 2). A peripheral edge of each guide panel 92 on the back side of the attachment piece 53 serves as a guide portion 93 when the screen 33 is assembled.

An eighth fixing hole 94 for fixing the inner cowl 62 (see FIG. 5) of the front center cowl 41 to the rear meter panel 49 is formed on a rear end side of each guide panel 92. The eighth fixing hole 94 of each guide panel 92 is formed at a position corresponding to the fourth fixing hole 67 (see FIG. 5) of the inner cowl 62, and the inner cowl 62 (the front center cowl 41) is clipped to the rear meter panel 49 at a portion where the fixing holes 94 and 67 overlap each other. For fixing exterior members such as various cowls and panels to each other, any fixing method of screwing, hooking, and clipping may be used.

In the fixing structure of the screen 33 configured as described above, a front half portion of the attachment piece 53 is sandwiched between the pressing portion 63 (see FIG. 2) of the front center cowl 41 (the outer cowl 61) and the support portion 82 of the front meter panel 48. A rear half portion of the attachment piece 53 is sandwiched between the pair of pressing portions 71 of the front side cowl 42 and the pair of support portions 64 (see FIG. 5) of the front center cowl 41 (the inner cowls 62). Such a sandwiching structure of the attachment piece 53 is adopted, so that rigidity of the screen 33 is sufficiently secured even when there are two fixing portions of the screen 33 using a fixing member (a screw, a clip, or the like).

Particularly, tip end sides of the pair of side surface portions 52 (see FIG. 2) of the screen 33 are fixed to the pair of front side cowls 42. The tip ends of the pair of side surface portions 52 are fixed, so that rigidity of the pair of side surface portions 52 that extend outward in the vehicle width direction from the front surface portion 51 of the screen 33 is increased. Further, in the present embodiment, the front half portion of the attachment piece 53 is pressed from a front side by the outer cowl 61 of the front center cowl 41, and the rear half portion of the attachment piece 53 is supported from a back side by the inner cowls 62 of the front center cowl 41. Since the sandwiching structure of the screen 33 is formed on a single member referred to as the front center cowl 41, rattling of the screen 33 is effectively prevented.

Figure 10A:
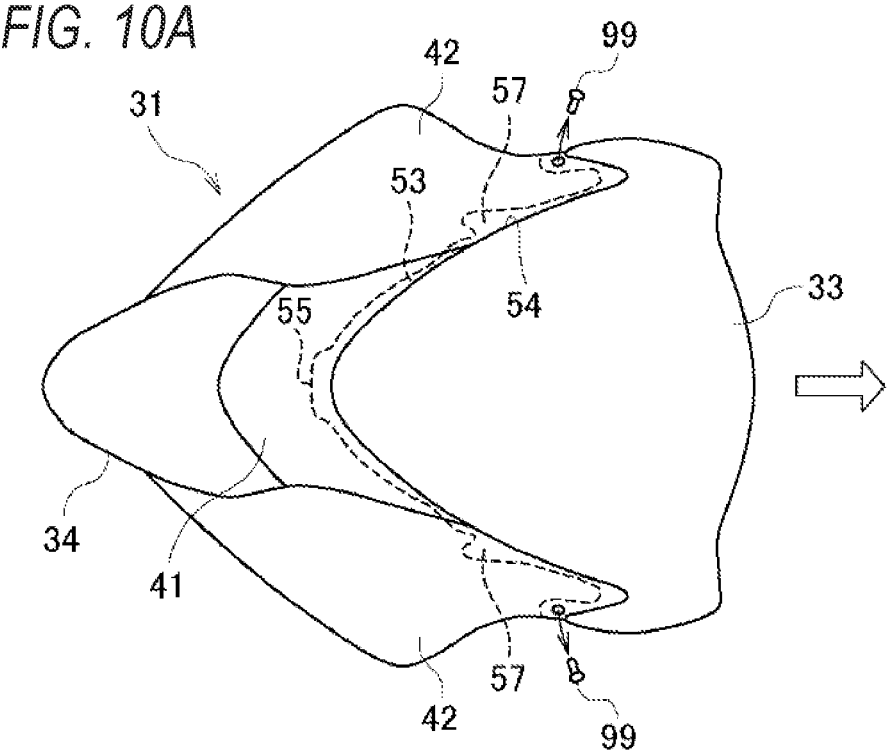
FIGS. 10A and 10B are illustrative diagrams of replacement work of the screen according to the present embodiment.

Replacement work of the screen will be described with reference to FIG. 10. FIG. 10 are illustrative diagrams of the replacement work of the screen according to the present embodiment. FIG. 10A shows removal work of the screen, and FIG. 10B shows attachment work of the screen.

As shown in FIG. 10A, the attachment piece 53 of the screen 33 is sandwiched between the front cowl 31 and the meter panel 47 (see FIG. 3). In the removal work of the screen 33, a pair of fixing members 99 are removed from the pair of front side cowls 42, a fixed state of the front side cowls 42 and the screen 33 is released, and the screen 33 is pulled out from between the front cowl 31 and the meter panel 47. Since the number of the fixing members 99 is minimized, a work load required for removing the fixing members 99 is reduced, and workability of the removal work of the screen 33 is improved.

Figure 10B:
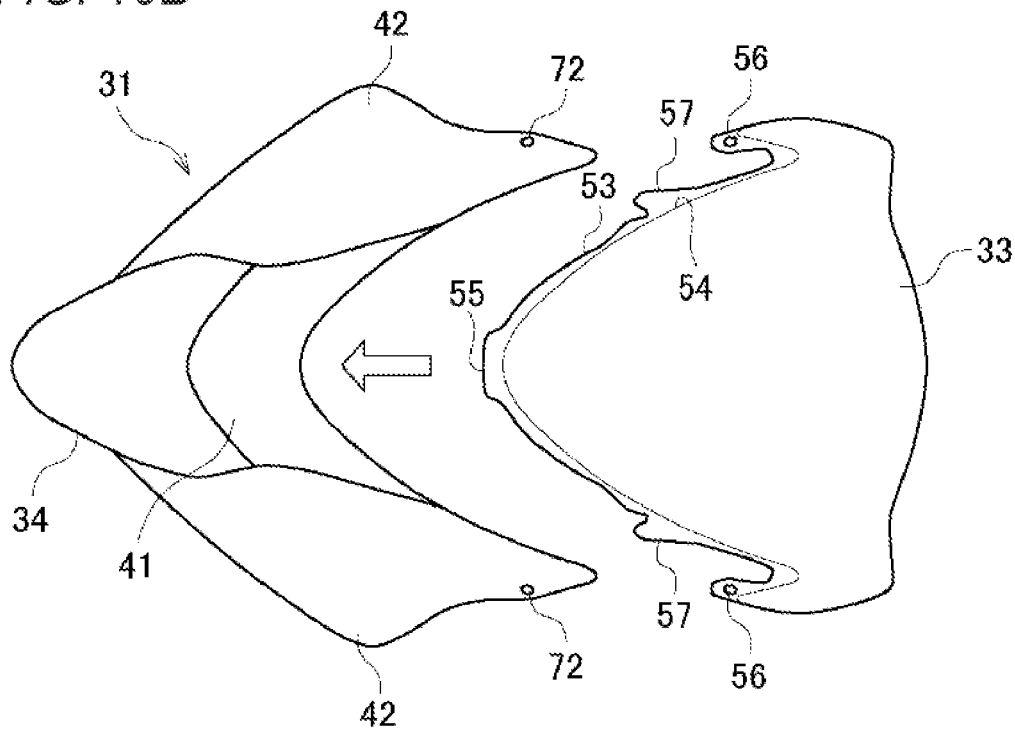

As shown in FIG. 10B, in the attachment work of the screen 33, the attachment piece 53 of the screen 33 is inserted between the front cowl 31 and the meter panel 47 (see FIG. 3). A deviation of the screen 33 is adjusted by hooking the pair of hooks 57 of the attachment piece 53 on the hook portions 68 (see FIG. 6) of the front cowl 31 (the front center cowl 41). If there is a response when the protrusion 58 (see FIG. 4) of the attachment piece 53 is fitted into the shallow groove 84 (see FIG. 4) of the meter panel 47 (the front meter panel 48), the positioning protrusion 55 of the attachment piece 53 completely enters the positioning recess 83 (see FIG. 7) of the meter panel 47. Further, the step 54 on the front surface of the attachment piece 53 abuts against a peripheral edge of the front cowl 31.

The pair of fifth fixing holes 72 of the pair of front side cowls 42 are aligned with the pair of first fixing holes 56 of the attachment piece 53 by positioning the screen 33. Then, the fixing members 99 are inserted into the fixing holes 72 and 56 from front sides of the front side cowls 42, and the front side cowls 42 and the attachment piece 53 are fixed by the fixing members 99, so that the screen 33 is attached between the front cowl 31 and the meter panel 47. Since the number of the fixing members 99 is minimized, a work load required for fixing the fixing members 99 is reduced, and workability of the attachment work of the screen 33 is improved.

As described above, according to the present embodiment, the attachment piece 53 of the screen 33 is sandwiched between the support portion 82 of the meter panel 47 and the pressing portions 63 and 71 of the front cowl 31. A combination of sandwiching the attachment piece 53 of the screen 33 and the fixing using the fixing members 99 can minimize the number of fixing members 99, and improve the workability of the replacement work of the screen 33 while securing the rigidity of the screen 33. Further, exposure of the fixing members 99 is reduced and appearance is also improved.

In the present embodiment, the front cowl is divided into three parts by the front center cowl and the pair of front side cowls, but a front cowl integrally formed by welding a plurality of members or the like may be used.

In the present embodiment, the attachment piece of the screen is pressed from the front side by the front center cowl and the pair of front side cowls, but the attachment piece of the screen may be pressed by one of the front center cowl and the pair of front side cowls.

In the present embodiment, the front center cowl includes the outer cowl and the inner cowls, but the front center cowl may include at least the outer cowl.

In the present embodiment, the attachment piece of the screen is supported from the back side by the front meter panel and the rear meter panel, but the attachment piece of the screen may be supported by one of the front meter panel and the rear meter panel. In the present embodiment, the rear meter panel is provided with the pair of guide panels, but the front meter panel may be provided with the pair of guide panels.

In the present embodiment, an entire region of the attachment piece of the screen is sandwiched between the front cowl and the meter panel, but a part of the attachment piece of the screen may be sandwiched between the front cowl and the meter panel.

In the present embodiment, the positioning protrusion is formed on the attachment piece of the screen and the positioning recess is formed in the meter panel, but the positioning recess may be formed in the attachment piece of the screen and the positioning protrusion may be formed on the meter panel. Further, the positioning portion may be formed on one of the attachment piece of the screen and the meter panel, the positioned portion may be formed on the other of the attachment piece of the screen and the meter panel, and shapes of the positioning portion and the positioned portion are not particularly limited.

In the present embodiment, the positioning portion and the positioned portion are formed on the attachment piece of the screen and the meter panel, but the positioning portion may be formed on one of the attachment piece of the screen and the front cowl, and the positioned portion may be formed on the other of the attachment piece of the screen and the front cowl. For example, the positioning protrusion may be formed on the attachment piece of the screen, and the positioning recess may be formed in the back surface of the front cowl.

In the present embodiment, the protrusion is formed on the back surface of the attachment piece of the screen, and the shallow groove is formed in a front surface of the meter panel, but the shallow groove may be formed in the back surface of the attachment piece of the screen, and the protrusion may be formed on the front surface of the meter panel. Further, the protrusion may be formed on one of the front surface of the attachment piece of the screen and the back surface of the front cowl, and the shallow groove may be formed in the other of the front surface of the attachment piece of the screen and the back surface of the front cowl. Shapes of the protrusion and the shallow groove are not particularly limited as long as the protrusion and the shallow groove have a shape that makes insertion of the screen feel responsive.

In the present embodiment, the screen is screwed to the front cowl, but the method of fixing the screen and the front cowl is not particularly limited. For example, the screen may be fixed to the front cowl by clipping.

The fixing structure of the screen of the saddle-ridden vehicle of the present embodiment is not limited to a motorcycle of a tourer type, and may be adopted for motorcycles of other types. Further, the saddle-ridden vehicle is not limited to all vehicles in which a rider rides in a posture of straddling a seat, but also includes a vehicle of a scooter type in which the rider rides without straddling a seat.

As described above, the fixing structure of the screen (33) of the present embodiment is a fixing structure of a screen, including the front cowl (31) that covers the vehicle front portion, the meter panel (47) disposed at a rear side of the front cowl, and a screen (33) installed between the front cowl (31) and the meter panel (47), in which the attachment piece (53) is formed along the front edge of the screen, the first support portion (82) that supports the attachment piece from the back side is formed on the meter panel, and the pressing portion (63, 71) that presses the attachment piece from the front side is formed on the front cowl. According to this configuration, the attachment piece of the screen is sandwiched between the support portion of the meter panel and the pressing portion of the front cowl. The combination of sandwiching the attachment piece of the screen and the fixing using the fixing members can minimize the number of fixing members, and improve the workability of the replacement work of the screen while securing the rigidity of the screen.

In the fixing structure of the screen of the present embodiment, the second support portion (64) that supports the attachment piece from the back side is formed on the front cowl, the pressing portion presses the front half portion of the attachment piece from the front side, the second support portion supports the rear half portion of the attachment piece from the back side, and the pressing portion and the second support portion are formed as a single member. According to this configuration, the front half portion of the attachment piece of the screen is pressed from the front side by the single member, and the rear half portion of the attachment piece of the screen is supported from the back side by the single member, so that the rattling of the screen is effectively prevented.

In the fixing structure of the screen of the present embodiment, the hook portion (68) disposed at the boundary portion between the pressing portion and the other support portion is formed on the front cowl, and the hook (57) to be hooked on the hook portion is formed on the attachment piece. According to this configuration, since the hook is hooked on the hook portion of the front cowl, the screen can be easily attached to the front cowl.

In the fixing structure of the screen of the present embodiment, the positioning portion (the positioning recess 83) is formed on one of the attachment piece and the first support portion, and the positioned portion (the positioning protrusion 55) to be positioned on the positioning portion is formed on the other of the attachment piece and the first support portion. According to this configuration, the screen is easily positioned with respect to the meter panel.

In the fixing structure of the screen of the present embodiment, the dome-shaped front surface portion (51) and the pair of side surface portions (52) connected to the rear side of the front surface portion are formed on the screen, and the screen is fixed to the front cowl on the tip end sides of the pair of side surface portions. According to this configuration, rigidity of the pair of side surface portions that extend outward in the vehicle width direction from the front surface portion of the screen is increased.

Although the present embodiment has been described, the above-described embodiment and modifications may be combined entirely or partially as another embodiment.

The technique of the present invention is not limited to the above-described embodiment, and various changes, substitutions, and modifications may be made without departing from the spirit of the technical concept of the present invention. Further, the present invention may be implemented using other methods as long as the technical concept can be implemented by the methods through advance of the technology or other derivative technology. Therefore, the claims cover all embodiments that may be included within the scope of the technical concept.

What is claimed is:

1. A fixing structure of a screen, comprising:
a front cowl configured to cover a vehicle front portion;
a meter panel disposed at a rear side of the front cowl;
a screen installed between the front cowl and the meter panel,
an attachment piece is formed along a front edge of the screen,
a first support portion configured to support the attachment piece from a back side is formed on the meter panel,
a pressing portion configured to press the attachment piece from a front side is formed on the front cowl,
a second support portion configured to support the attachment piece from a back side is formed on the front cowl,
the pressing portion presses a front half portion of the attachment piece from a front side,
the second support portion supports a rear half portion of the attachment piece from a back side,
the pressing portion and the second support portion are formed as a single member,
the front cowl comprises a front center cowl that covers a front side of the screen and a pair of front side cowls that cover both left and right sides of the screen,
the pressing portion includes a first pressing portion in the front center cowl and a second pressing portion in the front side cowl,
the first pressing portion and the second support portion are formed on the front center cowl,
the pair of front side cowls covers a front side of the attachment piece, and a peripheral edge of each front side cowl on the front side of the attachment piece serve as the second pressing portion that presses the attachment piece from a front side,
a front half portion of the attachment piece is sandwiched between the first pressing portion of the front center cowl and the front support portion of the front meter panel, and
a rear half portion of the attachment piece is sandwiched between the second pressing portion of the front side cowl and the second support portion of the front center cowl.

2. The fixing structure of the screen according to claim 1, further comprising:
a hook portion disposed at a boundary portion between the pressing portion and the second support portion, and formed on the front cowl, and
a hook to be hooked on the hook portion, which is formed on the attachment piece.

3. The fixing structure of the screen according to claim 1, further comprising:
a positioning portion is formed on one of the attachment piece and the first support portion, and
a positioned portion to be positioned on the positioning portion, which is formed on the other of the attachment piece and the first support portion.

4. The fixing structure of the screen according to claim 1, further comprising:
a dome-shaped front surface portion and a pair of side surface portions connected to a rear side of the front surface portion which are formed on the screen, and
the screen is fixed to the front cowl on tip end sides of the pair of side surface portions.

5. The fixing structure of the screen according to claim 1, further comprising:
a hook for hooking the screen to the front center cowl, which is formed at an intermediate position of the attachment piece, and
a boundary portion between the first pressing portion and the second support portion, which is one step lower than the first pressing portion and one step higher than the second support portion, and a hook portion on which the hook of the attachment piece is hooked is formed at the boundary portion.

6. The fixing structure of the screen according to claim 1, further comprising:
a fixing portion which extends from a back surface of the front side cowl toward the front center cowl, and
a first fixing hole for fixing the front side cowl to the front center cowl and the front meter panel, which is formed in the fixing portion, wherein the first fixing hole of the front side cowl is formed at a position corresponding to a second fixing hole of the front center cowl and a third fixing hole of the front meter panel, and the front side cowl is fixed to the front center cowl and the front meter panel at a portion where the first fixing hole, the second fixing hole and the third fixing hole overlap each other.

\* \* \* \* \*